Feb. 22, 1927. 1,618,587
J. T. GRADY
AUTOMATIC COOKING APPARATUS
Filed July 23, 1925    2 Sheets-Sheet 1

Feb. 22, 1927. 1,618,587
J. T. GRADY
AUTOMATIC COOKING APPARATUS
Filed July 23, 1925   2 Sheets-Sheet 2
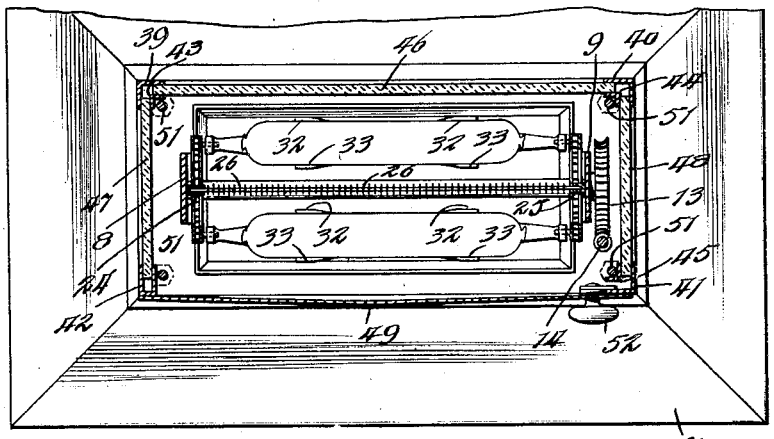
INVENTOR
James T. Grady
BY
P. Frank Smith
ATTORNEY Patented Feb. 22, 1927.

1,618,587

UNITED STATES PATENT OFFICE.

JAMES T. GRADY, OF WANOMASSA, NEW JERSEY, ASSIGNOR OF ONE-THIRD TO HENRY STEMME, OF NEW YORK, N. Y.

AUTOMATIC COOKING APPARATUS.

Application filed July 23, 1925. Serial No. 45,455.

The present invention relates generally to apparatus for cooking foodstuffs and is more especially directed to a device in which the foodstuffs are cooked by automatically feeding them through radiated heat waves produced electrically or otherwise.

In cooking various foodstuffs, such as sausages, frankfurters, meat cakes, commonly known as hamburger steaks, and the like, in restaurants, roadside stands and similarly exposed places, it has heretofore been the practice to employ a grid or plate heated by gas or other fuel, upon which the foodstuffs are placed and moved about or turned from time to time, until properly cooked.

These types of apparatus are extremely objectionable from a sanitary point as there is no satisfactory method of protecting the food from contamination while in process of cooking. This is especially true where the articles are exposed to dust and the like as in roadside stands and similar places where frankfurters, sausages and similar quick lunch foods are generally dispensed. In some instances a glass enclosure has been provided, but owing to the necessity for frequent attention on the part of the attendant in greasing the plate and turning the articles while cooking, one side of the enclosure remains open so that the latter is of little or no value as a sanitary measure. Furthermore, the operation of the present devices requires constant supervision by the attendant in order to properly prepare the food items for consumption, thereby adding to the general cost of maintenance of the establishment where the articles are sold.

The general object of the present invention is to provide an economical and efficient method of automatically cooking articles of food by radiated heat generated electrically or otherwise, which is especially applicable to the requirements of roadside stands, restaurants and other public eating places where the contents are more or less exposed to contamination.

More specifically, my invention comprehends an apparatus for cooking frankfurters, sausages, meat cakes and similar articles of food by means of automatically feeding or passing the foodstuff through radiated heat waves, generated electrically or otherwise, within an enclosure or housing whereby such foodstuffs are completely protected against contamination by dust or the like during the cooking process, the attention of the attendant being required only when supplying the raw or uncooked food to the apparatus and removing it when broiled or cooked.

It is also an object of my invention to insure absolutely sanitary conditions within the apparatus during the cooking operation and at the same time render the food articles constantly observable by the attendant and the public, this end being attained by utilizing an enclosure of transparent material, the elements of which may be readily disassembled to afford access to the components of the apparatus for cleaning and adjustment.

My invention further contemplates a cooking apparatus of the character set forth which is designed to be substituted for the present forms of grid or plate stoves and will overcome the objections thereto in a simple and efficient manner.

Other objects and advantages flowing from the practicing of my invention, will present themselves as the description proceeds, and I would have it expressly understood that I reserve unto myself all rights to the full range of equivalents, both in structure and in use, to which I may be entitled under my invention in its broadest aspect.

For the purposes of the present disclosure, I have elected to illustrate and describe a preferred embodiment of my invention. My invention however, may take other forms without departing from the spirit and scope thereof, as defined by the appended claims.

In the accompanying drawings:

Figure 2 is a plan view on the line $a$—$a$ of Figure 1;

Figure 3 is a sectional elevation of a fragment of the structure shown in Figure 1;

Figure 4 is a top plan view of a cradle or rack within which the food is carried as it is fed through the heat waves;

Figures 5 and 6 are details on the lines $b$—$b$ and $c$—$c$ respectively of Figure 4, and Figure 7 is a plan view of a modified form of rack or cradle.

Referring now to the drawings in detail, in which like characters of reference are employed to designate similar parts in the several views, 7 indicates the base of the apparatus, which may be of any preferred configuration and of any desired material, such, for instance, as sheet metal.

Figure 1:
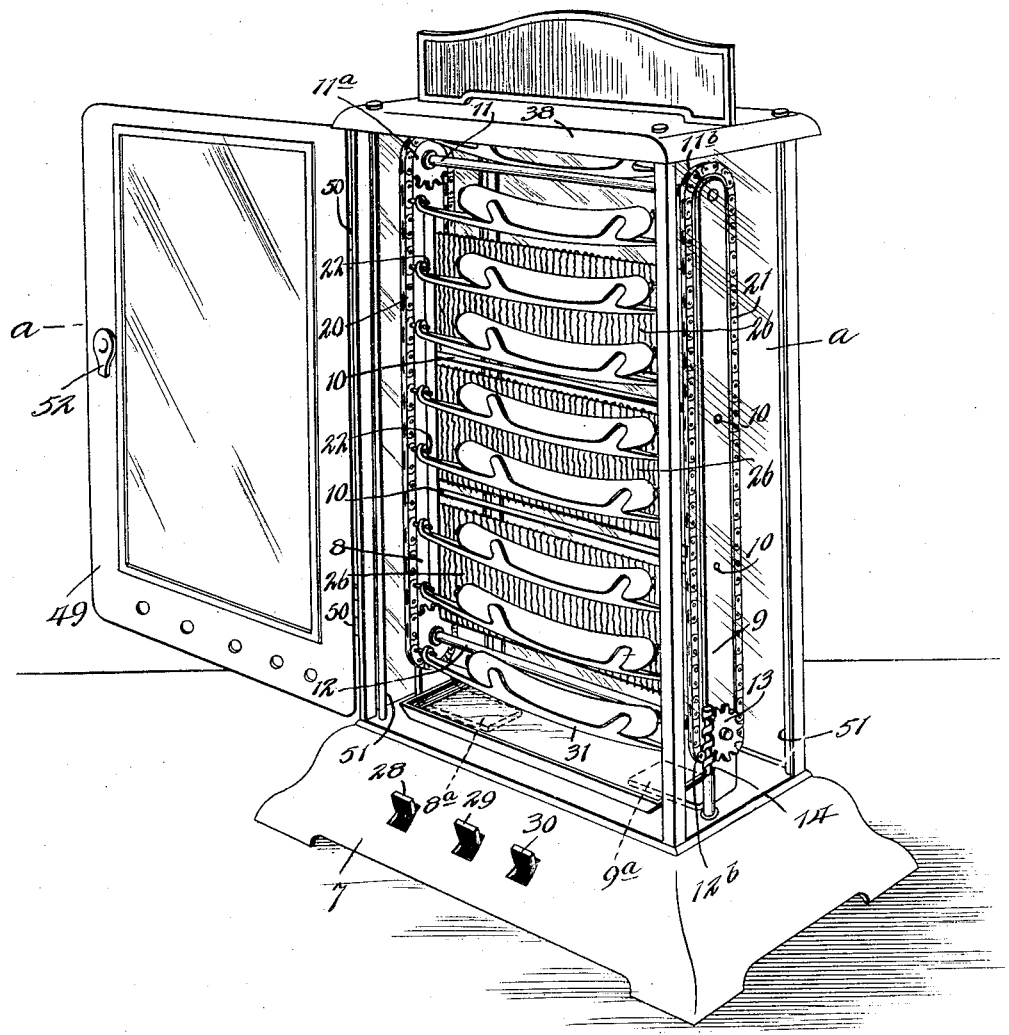
Figure 1 is a view in perspective of an apparatus made in accordance with my invention.

Supported upon the base 7, adjacent to the opposite ends thereof are standards 8 and 9 which may be of flat stock with inturned flanges 8ª and 9ª at their lower ends, by means of which they may be bolted, welded or otherwise rigidly fixed to the base, the said standards being laterally braced by the tie rods 10 which may be threaded into suitable apertures therein or otherwise secured thereto.

Journaled in suitable bearings provided in the standards 8 and 9 adjacent to the top and bottom thereof, are the shafts 11 and 12, each of which is provided with a pair of sprocket wheels 11ª, 11ᵇ and 12ª and 12ᵇ, keyed or otherwise fixed to the respective shafts, adjacent their ends, as shown in Figure 1.

The lower shaft 12, it will be observed, protrudes through the standard 9 and carries a gear wheel or pinion 13 in mesh with the worm 14 keyed or pinned to the perpendicular shaft 15. This latter shaft is journaled within a bearing 16 located in an opening provided in the top of the base 7 and carries a gear wheel 17 at its lower end which is in mesh with a pinion 18 fixed to the armature shaft of the motor 19, bolted or otherwise supported from the underside of the top of the base 7, as indicated at 19ª.

The alined sprockets 11ª and 12ª and 11ᵇ and 12ᵇ on the respective shafts 11 and 12 are connected by the chains 20 and 21, it being obvious that both of these shafts are driven by the motor 19 through the transmission gearing described.

Located at predetermined intervals on the inner faces of the chains 20 and 21 are the oppositely disposed pins or lugs 22 and 23 which may be fixed to the split links of the chains in any suitable manner, or which may be readily provided by connecting the split links to the block links at the desired intervals by pins which will be of a sufficient length to function as hereinafter described.

Projecting inwardly from the opposite faces of the standards 8 and 9 and centrally positioned thereon, are channel members 24 and 25, within which the relatively flat heating units 26 are mounted and secured in spaced relation in any suitable manner. In the present embodiment of my invention, the units 26 are of the type generally employed in generating heat electrically and consist of wire of the proper gage wound or coiled upon sheets of mica, the said units being connectable to a suitable source of energy by means of a base plug or the like connected to the leads extending from the units to the base of the apparatus, as indicated at 27 in Figure 3. The functioning of the heating units 26 may be controlled exteriorly of the apparatus, at a point remote therefrom, or, by means of switches 28, 29 and 30 mounted in the base 7 as shown in Figure 1.

Suspended from the pins or lugs 22 and 23 are cradles or racks 31 for the articles of food. These cradles or racks may be of any suitable configuration to efficiently perform their function. In the present showing, the aforesaid racks or cradles are designed to carry frankfurters, sausages or similar elongated articles and it will be observed that they are likewise elongated with a slight longitudinal curvature, conforming generally to the shape of the articles which they are adapted to carry.

The shallow troughlike cradles or racks have pairs of upstanding ears or projections on each side thereof, intermediate their ends, as indicated at 32 and 33, between which the food articles are retained when placed upon the rack or cradle. For mounting the cradles or racks upon the pins or lugs 22 and 23, the extremities of the tapered portions 31ª thereof, are struck up to provide an eye 34 at one end and a hook 35 at the other, whereby the cradles or racks may be quickly attached to or detached from the traveling chains, between which they are supported. (See Figures 1 to 6 inclusive.)

In the modified form of cradle or rack shown in Figure 7, it will be observed that additional oppositely disposed ears or upwardly projecting surfaces 36 and 37 are provided between the intermediate or body-portion of the cradle or rack and the ends thereof. These projections 36 and 37 serve as retainers for other food articles, such as meat cakes, slices of bread or the like which may be cooked or heated simultaneously with the articles held between the surfaces 32 and 33, as hereinafter described.

The heating elements and the associated conveyor mechanism just described, are contained within a protecting enclosure having a top 38, preferably of metal, which is supported upon the angle uprights 39, 40 and 41 and the channel upright 42, located at the respective corners of the top of the base 7. Suitable angle pieces 43, 44 and 45 are associated with the uprights 39, 40 and 41 to form channels within which panels 46, 47 and 48 of transparent material such as glass, may be removably positioned to form the front and sides of the enclosure, it being apparent that the channel upright 42 is adapted to receive one edge of the panel 47 and also function as a rigid support for the door 49 which is hinged thereto as shown at 50. This door preferably consists of a metal frame having a transparent panel mounted therein.

The top 38 is connected to the base 7 by the tie bolts 51, one at each corner, it being obvious that by disconnecting the top from the base, the panels of the enclosure may be readily removed to afford access to the conveyor mechanism for cleaning or adjusting the same. On the other hand, when the enclosure is assembled, it will be evident that by closing the door which is provided with a suitable latch 52, the articles of food within the racks or cradles are completely housed and protected from contamination by dust germs or the like.

In the operation of the apparatus, it will be manifest that as the chains 20 and 21 traverse the sprockets on the driven and idler shafts 12 and 11, the food racks or cradles 31, which are rotatable on the lugs or pins 22 and 23 will be maintained in a vertical plane as they make their cycles through the heat waves radiated by the heating elements. The articles of food are almost wholly directly exposed to the heat waves, those portions which are in contact with the surfaces of the cradles or racks receiving the heat transmitted by the metal so that the food is thoroughly and quickly cooked, the cooking being expedited by the fact that it is done in the heated atmosphere of the substantially air-tight container or enclosure. A suitable pan or receptacle 53 is located beneath the conveyor to receive the food drippings, which may be removed as frequently as necessary to preserve a sanitary condition.

If desired, the heating elements may be arranged to provide so-called graduated heats, in which event the lowermost element will preferably operate at the highest temperature, the maximum temperatures of the intermediate and topmost elements being stepped down accordingly to attain the required results, in cooking slowly or in preventing undue cooling of articles already cooked.

From the foregoing, it will be seen that I have evolved an apparatus which is simple and economical in operation and which meets the most stringent sanitary tests in the handling of foodstuffs. While I have described my invention with reference to the specific form shown, it will be evident that in lieu of electrical current, gas, coal oil or other suitable fuel may be used for generating the necessary heat, it being understood that my invention broadly contemplates an apparatus for attaining the objects hereinbefore set forth, irrespective of such changes in structural details as may be found necessary or desirable to meet specific requirements.

I claim:

1. An automatic cooking apparatus comprising a base, a heating element vertically disposed and centrally located on said base, a pair of shafts, each provided with sprockets adjacent its respective ends, supported from said base, said shafts being arranged respectively above and below said heating element, means for positively driving one of said shafts, chains in spaced relation traveling upon said sprockets and food containers swingably supported from and between said chains, whereby the path of travel of said containers will be around said heating element.

2. An automatic cooking apparatus, comprising a base, a heating element vertically disposed and centrally located on said base, a pair of shafts, each provided with sprockets adjacent its respective ends, supported from said base, said shafts being respectively arranged above and below said heating element, means for positively driving one of said shafts, chains in spaced relation to each other traveling upon said sprockets and elongated food containers detachably connected to said chains for rotation therebetween, said containers moving in a path around said heating element, whereby all parts of the food articles therein retained will be directly exposed to the waves radiated by said element.

3. An automatic cooking apparatus, embodying a vertically disposed heat generating element, rotatable means supported in planes above and below said element, food carriers, laterally spaced endless flexible devices adapted to traverse said rotatable means, said food carriers being swingably supported between said spaced devices, and means for actuating said devices to convey said food carriers around said heat generating element.

4. An automatic cooking apparatus comprising a base, a pair of shafts supported from said base in vertically spaced relation, a vertically disposed heat element located between said shafts, food carriers, and means traveling upon said shafts for supporting said food carriers, whereby said food carriers will travel in a continuous path around said heating element.

5. An automatic cooking apparatus, comprising a base, standards located thereon, a pair of vertically spaced parallel shafts having bearings in said standards, sprockets keyed to said shafts, adjacent their respective ends, laterally spaced chains connecting said shafts and traveling upon said sprockets, means for positively driving one of said shafts, food carriers rotatably connected to and supported between said chains, a heat generating element located between and in the vertical plane of said shafts and means for controlling the functioning of said driving means.

6. An automatically operating apparatus for cooking frankfurters, sausages and similarly constituted articles of food, comprising a base, a pair of vertically spaced shafts supported therefrom, laterally spaced flexible connections between said shafts, food carriers of a configuration conforming substantially to the shape of the food articles swingably suspended between said flexible connections, a vertically disposed heat generating element located between said shafts and means for driving said shafts, whereby the food carriers will pass completely around said heat generating element to successively expose all parts of the food articles directly to the heat waves.

JAMES T. GRADY.